3,080,432
PREPARATION OF CONJUGATED CYCLIC DIOLEFIN
Sterling E. Voltz, William P. Griffin, Jr., and Archibald P. Stuart, Media, Pa., assignors to Sun Oil Company, Philadelphia, Pa., a corporation of New Jersey
No Drawing. Filed June 1, 1960, Ser. No. 33,080
10 Claims. (Cl. 260—666)

This invention relates to the preparation of conjugated diolefin which has a two-carbon atom chain attached to a cyclohexene ring by catalytic conversion of a non-conjugated vinylcyclohexene. The conjugated diolefin product is useful in the production of solid polymers.

It is known in the art that 4-vinyl-1-cyclohexene can readily be prepared from butadiene by a Diels-Alder type of reaction. The present invention provides a novel method for converting the 4-vinyl-1-cyclohexene to an isomeric conjugated diolefin product which has one of the double bonds in the six-carbon atom ring and one associated with the side chain. Also the invention can be used to convert the other non-conjugated vinylcyclohexene, namely, 3-vinyl-1-cyclohexene, to the same conjugated diolefin product. While the exact identity of this product is not known with certainty, at least a part of it is 3-ethylidene-1-cyclohexene and it may also include 1-vinyl-1-cyclohexene. It is considered likely that the product is a mixture of these conjugated diolefins.

The present process is carried out by utilizing high surface sodium-on-alumina as the catalyst. It has been found that there are, surprisingly, two critical ranges of sodium content that can be used in order to produce the desired conjugated diolefin product. The proportion of sodium in the catalyst for one of these critical ranges is 0.1–3.0% by weight and for the other is 8.0–30.0% by weight. Sodium contents between the two ranges will not result in the formation of any substantial amount of the desired product. Best results generally are obtained at sodium contents of 0.7–1.5% and 14.0–17.0%.

According to the invention a non-conjugated vinylcyclohexene, which can have the vinyl group in either the 3 or 4 position and which for purpose of description hereinafter is referred to as 4-vinyl-1-cyclohexene, is contacted in liquid phase at a temperature in the range of −40° C. to +40° C., more preferably −15° C. to +25° C., with a sodium-on-alumina catalyst which has a sodium content, by weight, of either 0.1–3.0% or 8.0–30.0%. A sufficient time of contact is allowed to cause substantial conversion of the 4-vinyl-1-cyclohexene to conjugated diolefin product which includes 3-ethylidene-1-cyclohexene and probably also 1-vinyl-1-cyclohexene. Under most conditions within the ranges specified, ethyl benzene is also formed as a product. However, the formation of ethyl benzene can be suppressed by proper selection of conditions and under certain conditions essentially only the conjugated diolefin product can be obtained, as more fully described hereinafter. Also under certain conditions, styrene will appear in the product if too long a reaction time is permitted. Since styrene has about the same boiling point (146° C.) as the conjugated diolefin product (145–146° C.) and thus cannot be readily separated therefrom, its formation preferably is avoided in the present process by stopping the reaction before it appears in the product. On the other hand, any ethyl benzene formed can be separated from the product by distillation since it has a substantially lower boiling point (136° C.). Likewise unconverted 4-vinyl-1-cyclohexene (B.P.=130° C.) can be recovered by distillation and recycled to the reaction zone for further conversion.

The catalyst for the present process can readily be made by intimately mixing molten sodium with granular high surface alumina having a mesh size, for example, of 80–200 (U.S. Sieve Series). The alumina should have a surface area greater than 10 square meters per gram and preferably in the range of 50–300 sq. meter/g. It is essential that the amount of sodium used be such as to provide either 0.1–3.0% or 8.0–30.0% by weight thereof in the catalyst composition. Preferably the proportion of sodium is either 0.7–1.5% or 14.0–17.0%.

The process can be conducted in batch fashion or continuously by passing a stream of the 4-vinyl-1-cyclohexene charge through a bed of the catalyst. In either case the temperature should be in the range of −40° C. to +40° C. and more preferably −15° C. to +25° C. The composition of the reaction product depends upon the proportion of sodium in the catalyst, the reaction temperature selected and the time of contact, as shown by the data presented hereinafter. In batch operation the weight proportion of catalyst to hydrocarbon charge can vary widely, for example, from 1:100 to 1:1 and a time of contact suitable for effecting the degree of conversion desired can be selected accordingly. In continuous operation the time of contact affects the results obtained as illustrated by the tabulated data.

Specific Examples

A series of runs in which the percent sodium in the catalyst and the time of contact were varied while holding the reaction temperature at 0° C. was made in the following manner. For each run 40 g. of ground alumina (Alcoa F-1), which had previously been dried by heating in air at 400–500° C. for about 4 hours, was placed in a round bottom flask provided with a stirrer and heated to 160–170° C. Sodium was then added in amount to provide the desired proportion thereof in the catalyst and the mixture was stirred for 0.5 hr. This caused the melted sodium to be dispersed on the alumina, forming a gray or black sodium-on-alumina catalyst. The catalyst was then cooled to the desired reaction temperature and 100 ml. of 4-vinyl-1-cyclohexene, also cooled to the desired temperature, were added. The mixture was stirred while being maintained at the selected temperature level and small samples were taken at intervals for analysis by vapor phase chromatography. Results are shown in Table I.

TABLE I

| Run No. | Sodium concentration (wt. percent) | Temp., °C | Time (min.) | Relative concentrations | | | |
|---|---|---|---|---|---|---|---|
| | | | | 4-Vinyl-cyclo-hexene-1 | Conjugated diolefin | Ethyl benzene | Styrene |
| A | 1 | 0 | 0 | 100.0 | 0.0 | 0.0 | 0.0 |
| | | | 5 | 82.7 | 17.3 | 0.0 | 0.0 |
| | | | 30 | 78.4 | 21.6 | 0.0 | 0.0 |
| | | | 60 | 66.5 | 24.4 | 9.1 | 0.0 |
| | | | 120 | 56.8 | 27.3 | 15.9 | 0.0 |
| | | | 180 | 49.0 | 33.6 | 17.4 | 0.0 |
| | | | 240 | 42.8 | 34.9 | 22.3 | 0.0 |
| B | 5 | 0 | 0 | 100.0 | 0.0 | 0.0 | 0.0 |
| | | | 5 | 0.0 | 0.0 | 100.0 | 0.0 |
| C | 10 | 0 | 0 | 100.0 | 0.0 | 0.0 | 0.0 |
| | | | 5 | 37.9 | 27.4 | 34.7 | 0.0 |
| | | | 30 | 6.8 | 27.2 | 66.0 | 0.0 |
| | | | 180 | 0.0 | 8.6 | 85.3 | 6.1 |
| D | 15 | 0 | 0 | 100.0 | 0.0 | 0.0 | 0.0 |
| | | | 5 | 83.0 | 10.5 | 6.5 | 0.0 |
| | | | 30 | 54.2 | 25.9 | 19.9 | 0.0 |
| | | | 60 | 36.7 | 32.0 | 31.3 | 0.0 |
| | | | 120 | 13.7 | 29.7 | 48.6 | 8.0 |
| | | | 180 | 2.9 | 18.0 | 72.7 | 6.4 |
| E | 20 | 0 | 0 | 100.0 | 0.0 | 0.0 | 0.0 |
| | | | 5 | 100.0 | 0.0 | 0.0 | 0.0 |
| | | | 30 | 91.2 | 5.3 | 3.5 | 0.0 |
| | | | 60 | 81.5 | 11.6 | 6.9 | 0.0 |
| | | | 120 | 72.3 | 16.1 | 11.6 | 0.0 |
| | | | 180 | 61.4 | 20.7 | 17.9 | 0.0 |
| | | | 240 | 50.3 | 23.5 | 26.2 | 0.0 |
| | | | 300 | 38.6 | 26.7 | 34.7 | 0.0 |

Another series of runs was made in the same manner but the temperature was varied and the amount of sodium was kept at 20%. Data for these runs are presented in Table II along with the data for Run E which are tabulated again for ready comparison.

TABLE II

| Run No. | Sodium concentration (wt. percent) | Temp., °C | Time (min.) | Relative concentrations | | | |
|---|---|---|---|---|---|---|---|
| | | | | 4-Vinyl-cyclo-hexene-1 | Conjugated diolefin | Ethyl benzene | Styrene |
| F | 20 | −78 | (¹) | | | | |
| G | 20 | −13 | 0 | 100.0 | 0.0 | 0.0 | 0.0 |
| | | | 5 | 97.5 | 2.5 | 0.0 | 0.0 |
| | | | 30 | 93.3 | 6.7 | Trace | 0.0 |
| | | | 60 | 89.4 | 8.5 | 2.1 | 0.0 |
| | | | 120 | 84.1 | 12.8 | 2.1 | 0.0 |
| | | | 220 | 81.8 | 15.9 | 2.3 | 0.0 |
| | | | 300 | 78.4 | 18.9 | 2.7 | 0.0 |
| E | 20 | 0 | 0 | 100.0 | 0.0 | 0.0 | 0.0 |
| | | | 5 | 100.0 | Trace | Trace | 0.0 |
| | | | 30 | 91.2 | 5.3 | 3.5 | 0.0 |
| | | | 60 | 81.5 | 11.6 | 6.9 | 0.0 |
| | | | 120 | 72.3 | 16.1 | 11.6 | 0.0 |
| | | | 180 | 61.4 | 20.7 | 17.9 | 0.0 |
| | | | 240 | 50.3 | 23.5 | 26.2 | 0.0 |
| | | | 300 | 38.6 | 26.7 | 34.7 | 0.0 |
| H | 20 | 24 | 0 | 100.0 | 0.0 | 0.0 | 0.0 |
| | | | 5 | 92.8 | 4.0 | 3.2 | 0.0 |
| | | | 30 | 71.8 | 12.3 | 15.9 | 0.0 |
| | | | 60 | 57.2 | 17.0 | 25.8 | 0.0 |
| | | | 120 | 38.1 | 22.2 | 39.7 | 0.0 |
| | | | 180 | 26.4 | 22.0 | 51.6 | 0.0 |
| | | | 240 | 20.0 | 21.2 | 58.8 | 0.0 |
| | | | 300 | 12.0 | 22.2 | 65.8 | 0.0 |
| J | 20 | 50 | 0 | 100.0 | 0.0 | 0.0 | 0.0 |
| | | | 5 | 44.1 | Trace | 55.9 | 0.0 |
| | | | 30 | Trace | Trace | 100.0 | 0.0 |

¹ No reaction.

As shown by the results in Table I, variation in the sodium content of the catalyst has a curious effect on the results obtained. At the low sodium content of 1% (Run A), the conjugated diolefin in the product predominates over ethyl benzene. When the catalyst concentration is increased to 5% (Run B), the charge is converted almost immediately entirely to ethyl benzene at the 0° C. temperature level. This occurs with a rapid evolution of hydrogen. However, when the sodium content is increased to 10% (Run C), conjugated diolefin again appears in the product although ethyl benzene predominates. At 15% sodium (Run D) the conjugated diolefin predominates at earlier stages of the reaction but ethyl benzene predominates when long reaction times are used. At 20% sodium (Run E) the proportion of the two products are roughly equivalent in a little over 4 hrs. reaction time. The data also show that the rate of conversion of the 4-vinyl-1-cyclohexene is faster at 1% sodium than at 20% sodium, and that in the 10–20% range the rate decreases as the sodium content increases.

It can also be seen from Table I that if too long a time of reaction is allowed, styrene may appear in the product. As previously explained, this is undesirable since styrene has about the same boiling point as the desired conjugated diolefin product. The appearance of styrene can be avoided by stopping the reaction at a suitable time.

With reference to Table II, Run F shows that no reaction will be obtained if the temperature is too low and Run J shows that conversion at too high a temperature will produce hardly any conjugated diolefin. The data indicate that while the rate of conversion decreases as the temperature is reduced, a considerably higher proportion of conjugated diolefin in the product can be obtained at low temperature. Thus in Run G, after reaction at −13° C. for 5 hrs., the conjugated diolefin constituted about 87% of the conversion products.

The data in Table I illustrate conditions for a preferred manner of operating the present process whereby the conjugated diolefin is obtained as essentially the only conversion product. As shown by Run A, use of a small amount of sodium, such as 0.7–1.5%, in the catalyst and a fairly low temperature such as −15° C. to +10° C., results in the formation of only conjugated diolefin until a particular time of reaction has been reached. Thus the conversion to conjugated diolefin was 17.3% in 5 minutes and 21.6% in 30 minutes without any other product being formed. By utilizing these conditions the charge hydrocarbon can be passed through a bed of the catalyst with a contact time of 5–30 minutes, the product can then be distilled to separate unreacted 4-vinyl-1-cyclohexene from the higher boiling conjugated diolefin product, and the unconverted material can then be recycled to the reactor. By operating in this manner all of the charge hydrocarbon is converted to the conjugated diolefin.

The reason for the curious effect of varying the proportion of sodium in the catalyst, as illustrated by the data presented, is not understood with certainty but possibly may be explainable in the following manner. First, it is believed that the conjugated diolefin represents an intermediate stage in the conversion of 4-vinyl-1-cyclohexene to ethyl benzene. Hence, in order to obtain conjugated diolefin as product, the catalyst should not be so active under the operating conditions as to cause the conversion to proceed rapidly through the intermediate stage to the ethyl benzene stage. In the cases where styrene is formed if the reaction time is too long, it is not presently understood by just what mechanism it is produced.

Secondly, it seems probable that the alumina does not function merely as an inert support for the sodium but that it forms some sort of complex with the sodium which complex has high catalytic activity.

From the foregoing assumptions it appears that when a small amount of sodium is used such as in the lower range of 0.1–3.0%, the amount of the sodium-alumina complex formed is relatively small and hence the catalytic activity is not so high as to cause the reaction to proceed rapidly through the intermediate stage to the ethyl benzene stage. However when the sodium content is increased enough to be within the 3.0–8.0% range, for example to 5.0%, there is enough of the complex present to cause a high catalytic activity that results in the formation of ethyl benzene almost immediately with attendant rapid evolution of hydrogen. As the sodium content is increased within the range of 8.0–30.0%, there is a tendency to cover the complex with free sodium and thus mask the high catalytic effect of the complex. Hence the reaction rate tends to slow down and the proportion of conjugated diolefin to ethyl benzene in the product tends to increase.

The conjugated diolefin product of the present process can be polymerized by means of a Ziegler type catalytic system to form solid polymers. For example, the conjugated diolefin can be reacted at a temperature of 25–60° C. in an inert hydrocarbon solvent utilizing $TiCl_4$ and aluminum triethyl as catalyst to form a white, tough polymer in substantially a quantitative yield. On the other hand, when 4-vinyl-1-cyclohexene is reacted under the same reaction conditions, only a small yield of white granular polymer having a different appearance is obtained.

The product of the present process is shown by infrared absorption to be conjugated but not to contain any ethyl cyclohexadienes. The infrared spectrum also shows a methyl group, indicating that at least part of the product is 3-ethylidene-1-cyclohexene. Ultraviolet absorption shows a maximum at 235 millimicrons, which compares with the calculated values of 237 for 3-ethylidene-1-cyclohexene and 227 for 1-vinyl-1-cyclohexene. On the other hand, the product has the same retention time in vapor phase chromatography as pure 1-vinyl-1-cyclohexene. From these facts it seems likely that the product is a mixture of the two conjugated dienes with the ethylidene compound predominating.

While the specific examples given herein are directed to the use of 4-vinyl-1-cyclohexene as the starting material, the process is equally applicable to 3-vinyl-1-cyclohexene or to mixtures of the two non-conjugated diolefins.

We claim:

1. Method of preparing conjugated diolefin which comprises contacting a non-conjugated vinylcyclohexene at a temperature in the range of −40° C. to +40° C. and for a time sufficient to effect substantial conversion with a sodium-on-alumina catalyst in which the proportion of sodium therein is 0.1–3.0% by weight, and recovering from the reaction mixture conjugated diolefin having a two-carbon atom chain attached to a cyclohexene ring.

2. Method according to claim 1 wherein said temperature is in the range of −15° C. to +25° C.

3. Method according to claim 2 wherein said proportion of sodium is 0.7–1.5%.

4. Method according to claim 1 wherein said non-conjugated vinylcyclohexene is 4-vinyl-1-cyclohexene.

5. Method according to claim 1 wherein the temperature is about −15° C. to +10° C. and the proportion of sodium is 0.7–1.5%, and wherein the reaction is stopped before any substantial amount of ethyl benzene is formed, conjugated diolefin is separated from the reaction product and non-conjugated vinylcyclohexene is recycled for further conversion to conjugated diolefin.

6. Method according to claim 5 wherein said non-conjugated vinylcyclohexene is 4-vinyl-1-cyclohexene.

7. Method of preparing conjugated diolefin which comprises contacting a non-conjugated vinylcyclohexene at a temperature in the range of −40° C. to +40° C. and for a time sufficient to effect substantial conversion with a sodium-on-alumina catalyst in which the proportion of sodium therein is 8.0–30.0% by weight, and recovering from the reaction mixture conjugated diolefin having a two-carbon atom chain attached to a cyclohexene ring.

8. Method according to claim 7 wherein said temperature is in the range of −15° C. to +25° C.

9. Method according to claim 7 wherein said proportion of sodium is 14.0–17.0%.

10. Method according to claim 7 wherein said non-conjugated vinylcyclohexene is 4-vinyl-1-cyclohexene.

References Cited in the file of this patent

UNITED STATES PATENTS

| | | |
|---|---|---|
| 2,804,489 | Pines et al. | Aug. 27, 1957 |
| 2,965,689 | Roebuck et al. | Dec. 20, 1960 |